(12) United States Patent
Araki

(10) Patent No.: US 12,229,456 B2
(45) Date of Patent: Feb. 18, 2025

(54) IMAGE FORMING APPARATUS THAT PERFORMS INSPECTION PROCESSING ON PRINT DATA AND METHOD OF CONTROLLING IMAGE FORMING APPARATUS

(71) Applicant: CANON KABUSHIKI KAISHA, Tokyo (JP)

(72) Inventor: Keishi Araki, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/841,717

(22) Filed: Jun. 16, 2022

(65) Prior Publication Data

US 2023/0004334 A1  Jan. 5, 2023

(30) Foreign Application Priority Data

Jun. 30, 2021 (JP) .................... 2021-109298

(51) Int. Cl.
G06F 3/12 (2006.01)
G06V 30/19 (2022.01)
G06V 30/24 (2022.01)

(52) U.S. Cl.
CPC .......... *G06F 3/1212* (2013.01); *G06F 3/1222* (2013.01); *G06F 3/1253* (2013.01); *G06V 30/19007* (2022.01); *G06V 30/2528* (2022.01)

(58) Field of Classification Search
CPC .... G06F 3/1212; G06F 3/1222; G06F 3/1253; G06V 30/19007; G06V 30/2528
See application file for complete search history.

(56) References Cited

U.S. PATENT DOCUMENTS

| | | | | |
|---|---|---|---|---|
| 2007/0229898 A1* | 10/2007 | Tomaru | ............... | G03G 15/0194 |
| | | | | 358/1.16 |
| 2008/0037065 A1* | 2/2008 | Kawata | ................. | G06F 21/608 |
| | | | | 358/1.16 |
| 2008/0144062 A1* | 6/2008 | Nakatsuka | ............ | G06F 40/189 |
| | | | | 358/1.11 |

(Continued)

FOREIGN PATENT DOCUMENTS

| | | | | |
|---|---|---|---|---|
| JP | 2004023149 A | | 1/2004 | |
| JP | 2009026077 A | * | 2/2009 | ........... G06F 3/1204 |
| JP | 2010049520 A | | 3/2010 | |

*Primary Examiner* — Huo Long Chen
(74) *Attorney, Agent, or Firm* — ROSSI, KIMMS & McDOWELL LLP

(57) ABSTRACT

An image forming apparatus capable of controlling execution of inspection without increasing a time period required to complete printing. On a registration screen, whether or not to execute inspection of data to be printed is set, and keywords indicative of confidentiality are registered. Text information is extracted from the data to be printed, and whether or not any keyword matching the text information has been registered is determined. Execution of print processing of the data to be printed is controlled based on a result of the determination. When non-execution of inspection is set, the print processing of the data to be printed is executed without executing the determination, whereas when execution of inspection is set, the print processing of the data to be printed is controlled based on a result of the determination.

10 Claims, 8 Drawing Sheets

(56) References Cited

U.S. PATENT DOCUMENTS

| | | | | |
|---|---|---|---|---|
| 2008/0239365 A1* | 10/2008 | Salgado | ............... | G06F 3/1284 |
| | | | | 358/1.15 |
| 2009/0021785 A1* | 1/2009 | Okabe | .................. | G06F 3/1288 |
| | | | | 358/1.15 |
| 2014/0022592 A1* | 1/2014 | Ueda | .................... | G06F 3/1219 |
| | | | | 358/1.15 |
| 2018/0129815 A1* | 5/2018 | Mashimo | .............. | G06F 3/1222 |

* cited by examiner

IMAGE FORMING APPARATUS THAT PERFORMS INSPECTION PROCESSING ON PRINT DATA AND METHOD OF CONTROLLING IMAGE FORMING APPARATUS

BACKGROUND OF THE INVENTION

Field of the Invention

The present invention relates to an image forming apparatus that performs inspection processing on print data and a method of controlling the image forming apparatus.

Description of the Related Art

Recent changes in working styles have caused diversification of installation places of devices, such as information apparatuses and image forming apparatuses, and user's environments, and acceleration of a trend to dispersion of users and devices. For this reason, such devices have come to be more often used not only within the firewall, but also by being directly accessed from an external network, such as the Internet. Under such circumstances, the security model has changed from a boundary protection model which assumes that the boundary is protected against the outside by the firewall, to a zero-trust security model which assumes that nothing is trusted based on the ethical doctrine that human inborn nature is evil.

In the zero-trust security, it is necessary to trust nothing and doubt everything. Therefore, there is a demand, for example, for an image forming apparatus that is capable of preventing occurrence of a situation, such as a case where a malicious user leaks confidential information to the outside. Japanese Laid-Open Patent Publication (Kokai) No. 2010-49520 proposes, as a technique for preventing the above-mentioned leakage of confidential information, a technique for performing, before printing data to be printed, processing for inspecting the data to be printed based on keywords registered in advance.

However, in the above-described technique disclosed in Japanese Laid-Open Patent Publication (Kokai) No. 2010-49520, the inspection is executed also on print data which does not require the inspection, which causes a problem that a time period required to complete printing is increased.

SUMMARY OF THE INVENTION

The present invention provides an image forming apparatus that is capable of controlling execution of inspection without increasing a time period required to complete printing, and a method of controlling the image forming apparatus.

In a first aspect of the present invention, there is provided an image forming apparatus that performs print processing of acquired data to be printed, including at least one processor, and a memory coupled to the at least one processor, the memory having instructions that, when executed by the processor, perform the operations as: a first setting unit configured to set whether or not to execute inspection of data to be printed, a registration unit configured to register keywords indicative of confidentiality, an extraction unit configured to extract text information from the data to be printed, a determination unit configured to determine whether or not any keyword matching the text information has been registered, and a print control unit configured to control execution of print processing of the data to be printed, based on a result of the determination performed by the determination unit, wherein when non-execution of inspection is set by the first setting unit, the print processing of the data to be printed is executed without executing the determination performed by the determination unit, whereas when execution of inspection is set by the first setting unit, the print processing of the data to be printed is controlled by the control unit based on a result of the determination performed by the determination unit.

In a second aspect of the present invention, there is provided a method of controlling an image forming apparatus that performs print processing of acquired data to be printed, including setting whether or not to execute inspection of data to be printed, registering keywords indicative of confidentiality, extracting text information from the data to be printed, determining whether or not any keyword matching the text information has been registered, controlling execution of print processing of the data to be printed based on a result of said determining, executing the print processing of the data to be printed without executing said determining when non-execution of inspection is set by said setting, and executing said determining and controlling the print processing of the data to be printed by said controlling when execution of inspection is set by said setting.

According to the present invention, it is possible to reduce a time period required to perform inspection processing on data to be printed.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
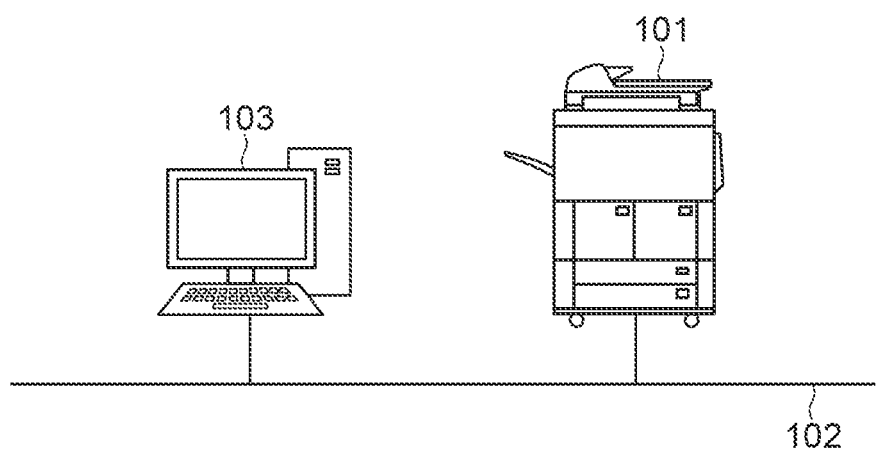
FIG. 1 is a block diagram schematically showing a network configuration of an image forming apparatus according to an embodiment of the present invention.

FIG. 1 is a block diagram schematically showing a network configuration of an image forming apparatus 101 according to an embodiment of the present invention. Referring to FIG. 1, the image forming apparatus 101 is communicably connected to a PC 103 via a network 102. With this, the image forming apparatus 101 is enabled to transmit and receive print data to be printed, image data of an original read by a scanner section 211, described hereinafter with reference to FIG. 2, of the image forming apparatus 101, device management information, and the like, to and from the PC 103 via the network 102. The image forming apparatus 101 is an apparatus equipped with a print function, such as a multifunction peripheral (MFP) or a single function peripheral (SFP). For example, the image forming apparatus 101 performs print processing based on print data received from the PC 103.

Figure 2:
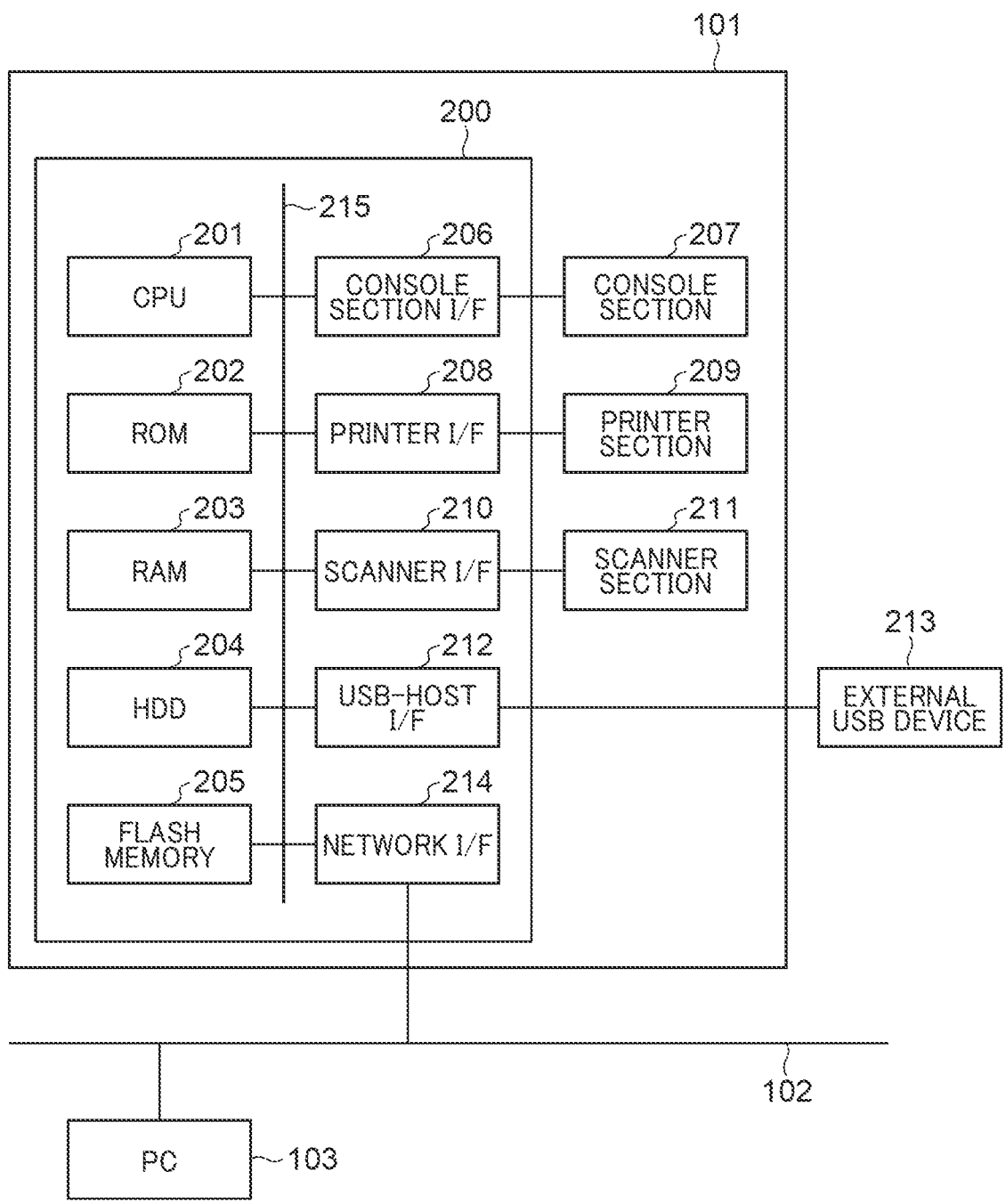
FIG. 2 is a block diagram schematically showing a hardware configuration of the image forming apparatus appearing in FIG. 1.

FIG. 2 is a block diagram schematically showing a hardware configuration of the image forming apparatus 101 appearing in FIG. 1. Referring to FIG. 2, the image forming apparatus 101 includes a main controller 200, a console section (operation panel) 207, a printer section 209, and the scanner section 211. The main controller 200 is connected to the console section 207, the printer section 209, and the scanner section 211. Further, the main controller 200 includes a CPU 201, a ROM 202, a RAM 203, an HDD 204, a flash memory 205, a console section (operation panel) interface 206, a printer interface 208, a scanner interface 210, a USB-Host interface 212, and a network interface 214. These components are interconnected via a system but 215.

The CPU 201 executes software programs of the image forming apparatus 101 and controls the overall operation of the apparatus. The ROM 202 is a read only memory and stores a boot program of the image forming apparatus 101, fixed parameters, a main system program 300, described hereinafter with reference to FIG. 3, and so forth. The RAM 203 is a random access memory and is used as an area for temporarily storing programs and a variety of data when the CPU 201 controls the image forming apparatus 101. The HDD 204 is a hard disk drive and stores system software, application programs, and a variety of data. The CPU 201 controls the operation of the image forming apparatus 101 by executing the boot program stored in the ROM 202, loading programs stored in the HDD 204 into the RAM 203, and executing the loaded programs.

The flash memory 205 stores a loader, a kernel, application programs, and so forth. Further, the flash memory 205 stores license information for enabling functions of the image forming apparatus 101, and a signature and a public key used for detecting tampering of a program. The console section interface 206 transfers an instruction input to the console section 207 by a user, to the CPU 201. Further, the console section interface 206 receives data for displaying a screen on the console section 207 from the CPU 201 and transfers the received data to the console section 207. The console section 207 includes a liquid crystal display section having a touch panel function and a keyboard. The console section 207 displays the status of the image forming apparatus 101 and an operation menu, and further, receives an instruction from a user.

The printer interface 208 controls print processing performed by the printer section 209. The scanner interface 210 controls scan processing performed by the scanner section 211. The USB-Host interface 212 is an interface for connecting an external USB device 213 to the main controller 200. The external USB device 213 is e.g. a USB memory or a USB keyboard. The main controller 200 acquires an update file required for updating the firmware from the USB memory connected to the USB-Host interface 212. Further, the external USB device 213 is e.g. a FAX unit. The FAX unit connected to the USB-Host interface 212 acquires image data stored in the HDD 204 via the USB-Host interface 212 and performs FAX transmission based on the acquired image data. Further, the FAX unit generates image data based on data transmitted from an external apparatus by FAX and stores the generated image data in the HDD 204 via the USB-Host interface 212. Note that the image data stored in the HDD 204 is printed on a sheet by the printer section 209. The network interface 214 controls transmission/reception of data to and from the PC 103 and the like.

Figure 3:
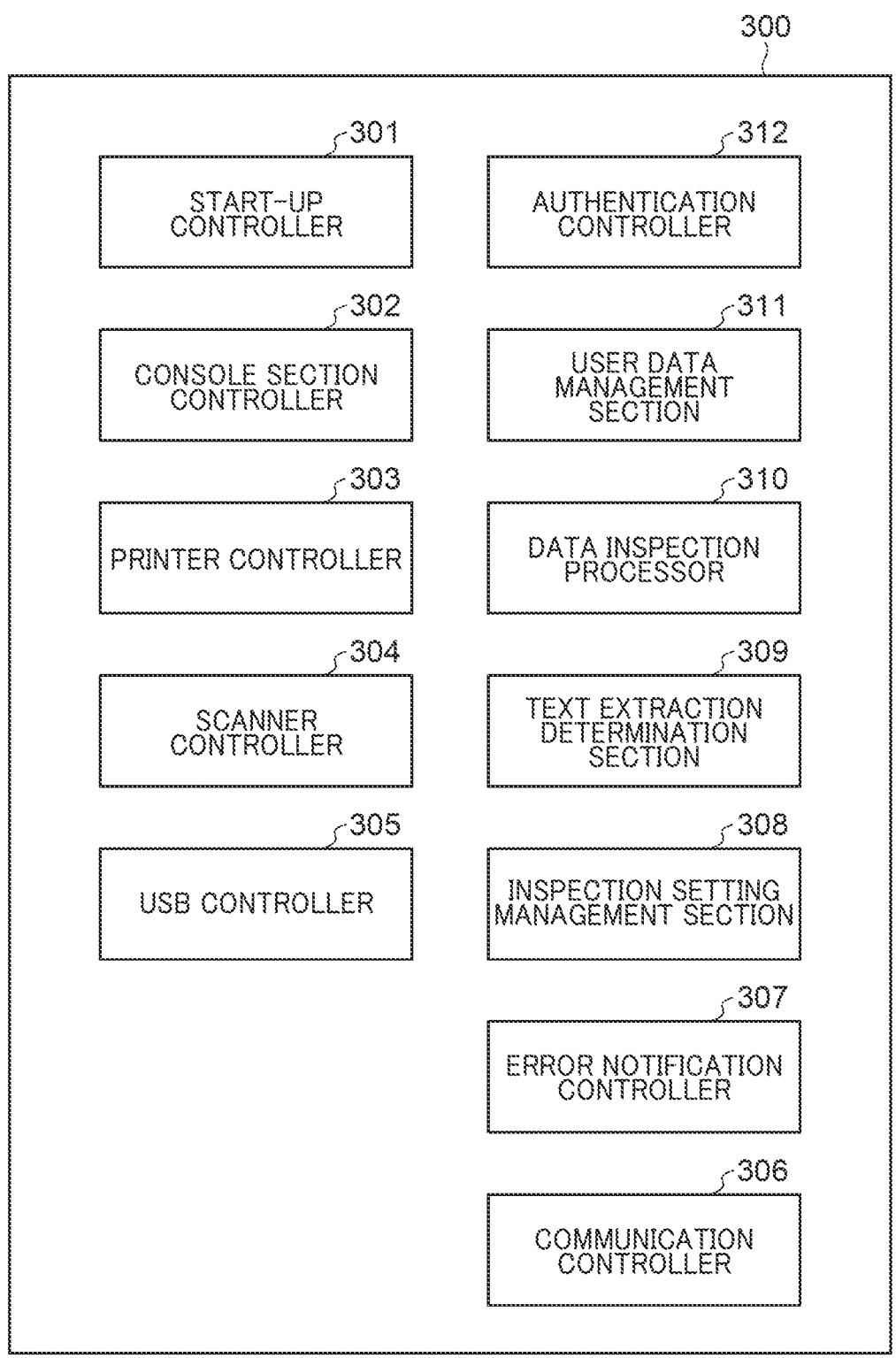
FIG. 3 is a block diagram schematically showing a configuration of a main system program stored in a ROM appearing in FIG. 2.

FIG. 3 is a block diagram schematically showing a configuration of the main system program 300 stored in the ROM 202 appearing in FIG. 2. Referring to FIG. 3, the main system program 300 is comprised of a start-up controller 301, a console section controller 302, a printer controller 303, a scanner controller 304, a USB controller 305, a communication controller 306, an error notification controller 307, an inspection setting management section 308, a text extraction determination section 309, a data inspection processor 310, a user data management section 311, and an authentication controller 312. The CPU 201 executes the main system program 300 loaded from the ROM 202 into the RAM 203, whereby the processing operations performed by the above-described components are realized.

The start-up controller 301 controls processing performed when the image forming apparatus 101 is started up. The start-up controller 301 starts up an OS (operating system) of the main controller 200, i.e. a basic system for causing operation of a variety of programs. The console section controller 302 controls the console section 207 via the console section interface 206. The printer controller 303 controls printing performed by the printer section 209. The scanner controller 304 is a module for executing a function of the scanner section 211 for reading an original or the like. The USB controller 305 controls the external USB device 213 connected to the USB-Host interface 212. The communication controller 306 controls a plurality of protocols supported by the image forming apparatus 101. The error notification controller 307 transmits an error notification to the console section 207 or an external apparatus connected via the network 102 when a problem is detected from print data by print data inspection processing.

The inspection setting management section 308 manages settings related to the print data inspection processing (hereinafter referred to as the "inspection-related settings"). The inspection-related settings are set by an administrator of the image forming apparatus 101. The inspection-related settings include, for example, a setting indicating whether or not an inspection mode of the image forming apparatus 101 is enabled, inspection keywords used for the print data inspection processing, and a setting related to a warning issued when a problem is detected from print data. For example, the inspection setting management section 308 outputs the inspection keywords to the data inspection processor 310 when the print data inspection processing is performed.

The text extraction determination section 309 determines whether or not print data is data from which text information can be directly extracted without performing OCR processing, and outputs a result of the determination to the data inspection processor 310. The data inspection processor 310 performs inspection processing on print data based on the inspection keywords acquired from the inspection setting management section 308.

The user data management section 311 manages information on a user to be permitted to use the image forming apparatus 101 (hereinafter referred to as the "user information"). The authentication controller 312 performs authentication processing based on authentication information input to the console section 207 by a user and the user information managed by the user data management section 311.

Figure 4:
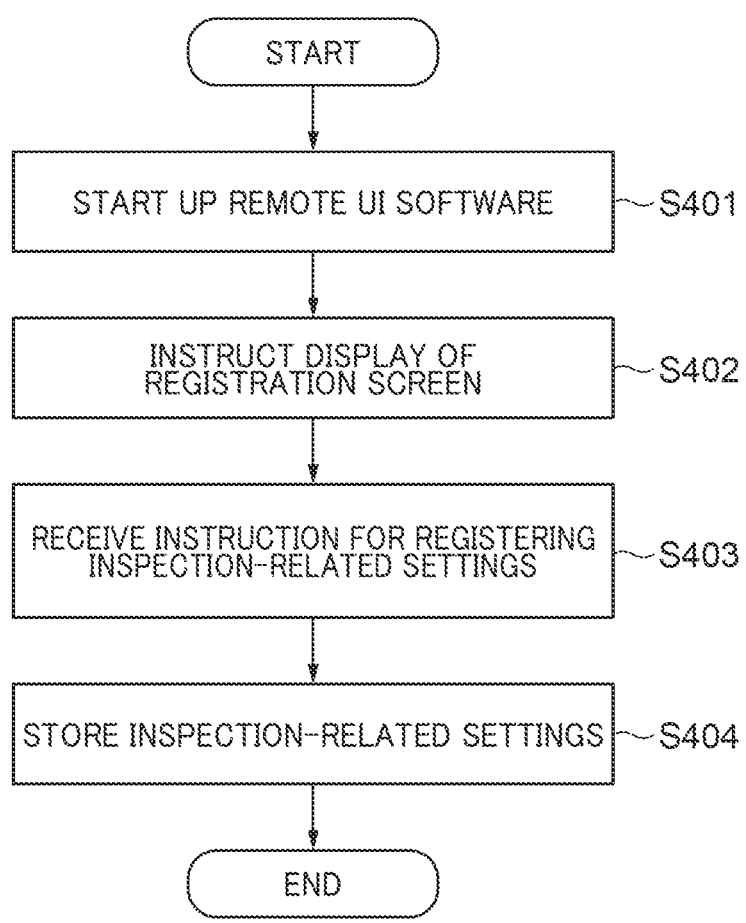
FIG. 4 is a flowchart of an inspection-related setting registration process performed by the image forming apparatus appearing in FIG. 1.

FIG. 4 is a flowchart of an inspection-related setting registration process performed by the image forming apparatus 101 appearing in FIG. 1. The inspection-related setting registration process in FIG. 4 is realized by the CPU 201 that loads programs including the main system program 300, from the ROM 202 into the RAM 203 and executes the loaded programs.

Referring to FIG. 4, first, upon receipt of a connection instruction input to a web browser of the PC 103 by the administrator of the image forming apparatus 101 via the network 102, the CPU 201 starts up remote UI software according to the received connection instruction (step S401). When the remote UI software is started up, the user is enabled to confirm the status of the image forming apparatus 101 and set a variety of settings from the PC 103. Then, the CPU 201 displays a registration screen 500 shown in FIG. 5 on a display section (not shown) of the PC 103 (step S402).

The registration screen 500 is comprised of an inspection mode setting 501, an inspection keyword setting 502, and an inspection-time operation setting 503. When a check box in the inspection mode setting 501 is in a selected state, the inspection mode of the image forming apparatus 101 is enabled. In a case where the inspection mode is enabled, the image forming apparatus 101 performs inspection on print data before starting printing. On the other hand, when the check box in the inspection mode setting 501 is in an unselected state, the inspection mode of the image forming apparatus 101 is disabled. In a case where the inspection mode is disabled, the image forming apparatus 101 starts printing without performing inspection on print data. Here, the registration screen 500 may be configured such that when the inspection mode setting 501 is in the unselected state, the inspection keyword setting 502 and the inspection-time operation setting 503 are hidden or grayed out to inhibit a user from setting these items.

Figure 5:
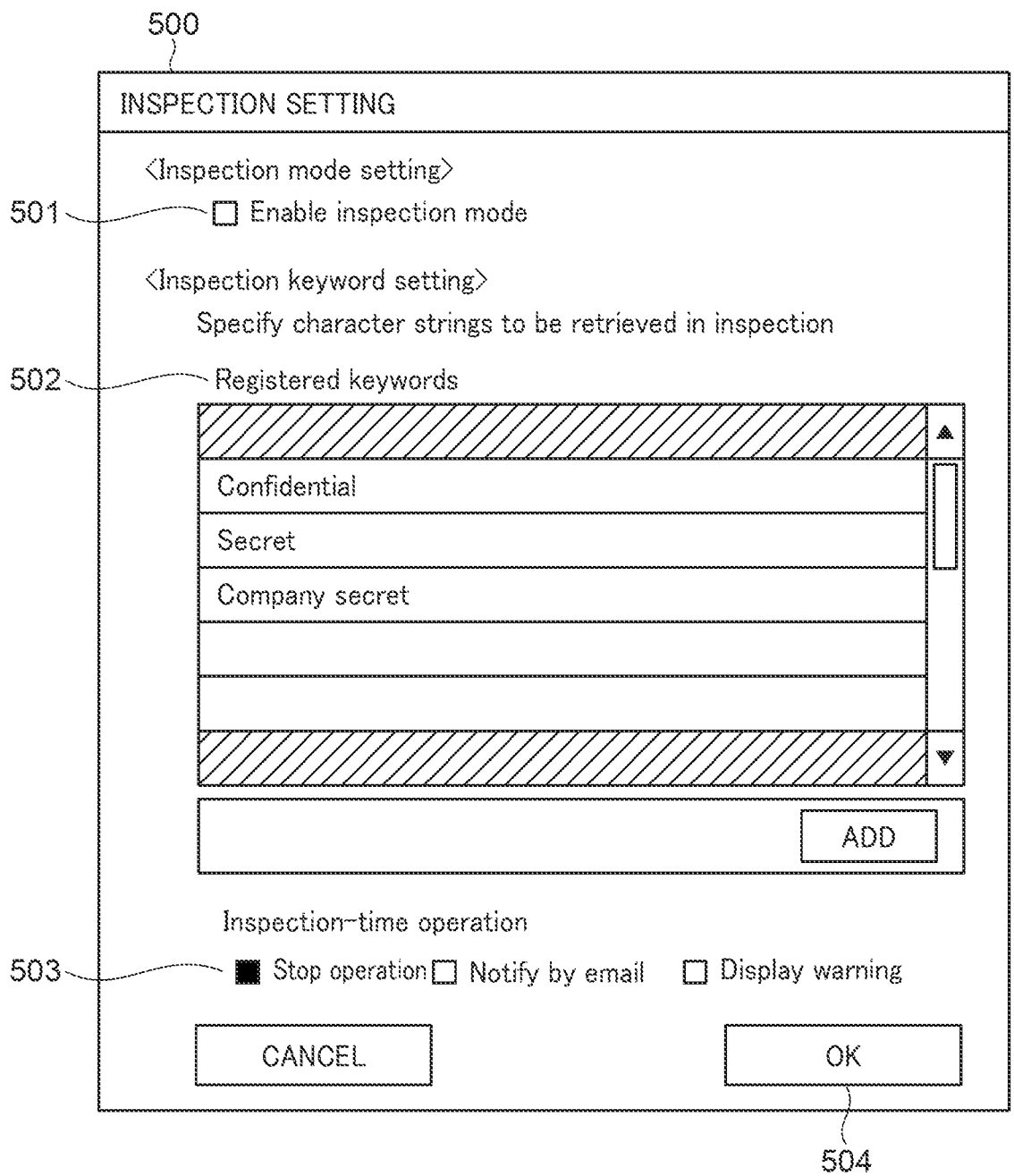
FIG. 5 is a diagram showing an example of a registration screen displayed on a display section of a PC appearing in FIG. 1.

In the inspection keyword setting 502, inspection keywords used for the print data inspection processing are set. The inspection keywords are keywords indicating confidentiality, such as confidential, secret, and company secret. In the present embodiment, as shown in FIG. 5, a plurality of inspection keywords can be set. In the inspection-time operation setting 503, there is set a setting related to an operation to be performed when it is determined by the inspection processing that any inspection keyword matching text information extracted from print data has been registered. Specifically, in the inspection-time operation setting 503, there is set one of "Stop operation" for stopping printing, "Notify by email" for sending a notification to the effect that the print data is unprintable data, by email, and "Display warning" for displaying a warning to the effect that the print data is unprintable data, on the console section 207. Although in FIG. 5, only one of the settings, i.e. "Stop operation" is selected by way of example, the setting of the inspection-time operation setting 503 may be configured such that a plurality of settings, such as both of "Stop operation" and "Notify by email", can be selected.

When an OK button 504 is selected, the instruction for registering the inspection-related settings input on the registration screen 500 is transmitted from the PC 103 to the image forming apparatus 101.

Upon receipt of the instruction for registering the inspection-related settings from the PC 103 (step S403), the CPU 201 stores the inspection-related settings input on the registration screen 500 in the HDD 204 (step S404) or the like, followed by terminating the present process.

Although in the process in FIG. 4, the description is given of the configuration that the administrator of the image forming apparatus 101 instructs registration of the inspection-related settings from the PC 103, this is not limitative. For example, the administrator of the image forming apparatus 101 may instruct registration of the inspection-related settings by operating the console section 207.

Figure 6:
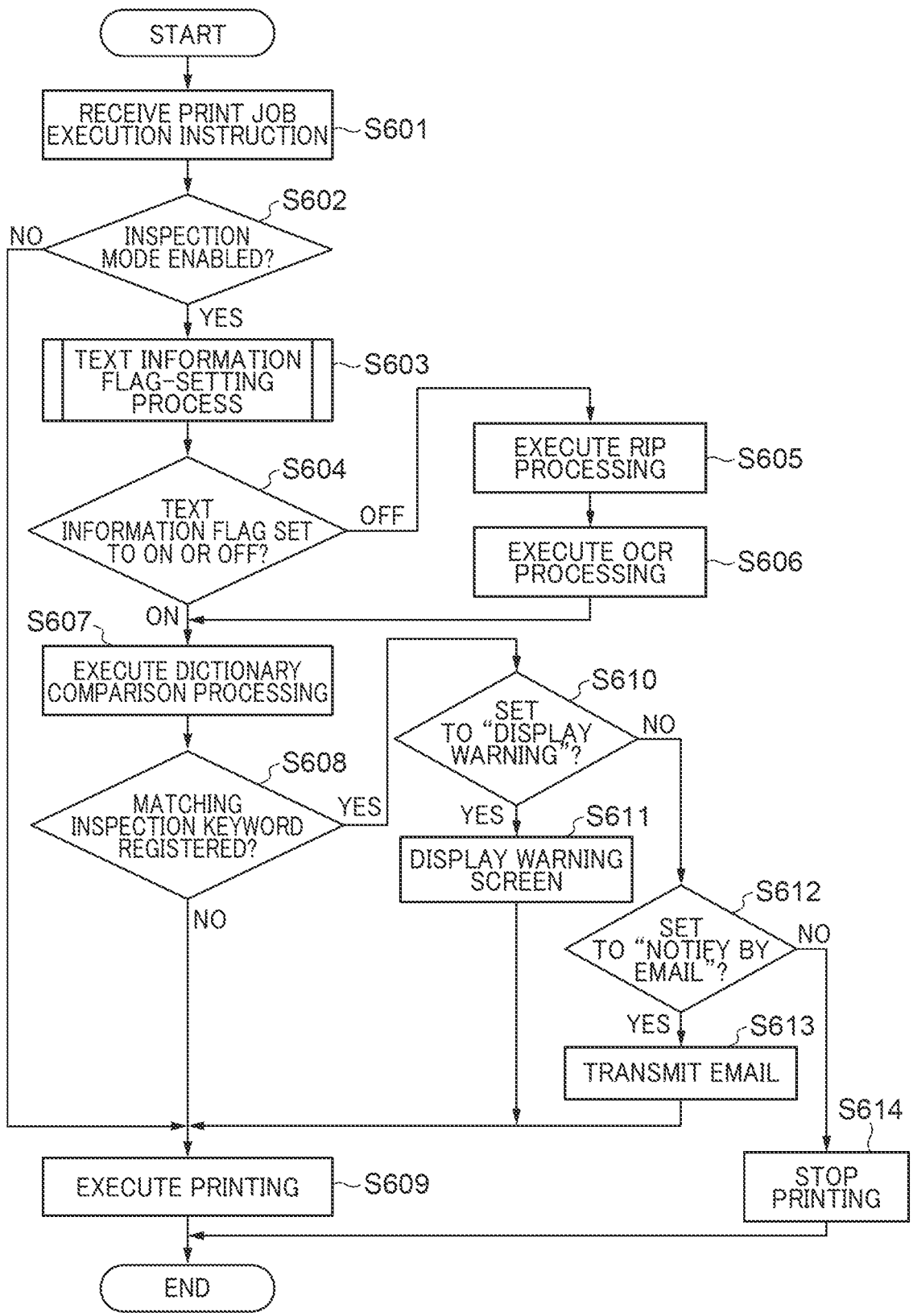
FIG. 6 is a flowchart of a print control process performed by the image forming apparatus appearing in FIG. 1.

FIG. 6 is a flowchart of a print control process performed by the image forming apparatus 101 appearing in FIG. 1. The print control process in FIG. 6 is also realized by the CPU 201 that loads programs including the main system program 300, from the ROM 202 into the RAM 203 and executes the loaded programs.

Referring to FIG. 6, the CPU 201 receives an instruction for executing a print job from a user (step S601). Note that the user instructs the image forming apparatus 101 to execute a print job by operating the console section 207 or the PC 103. Then, the CPU 201 determines whether or not the inspection mode of the image forming apparatus 101 is enabled, based on the inspection-related settings managed by the inspection setting management section 308 (step S602).

Figure 7:
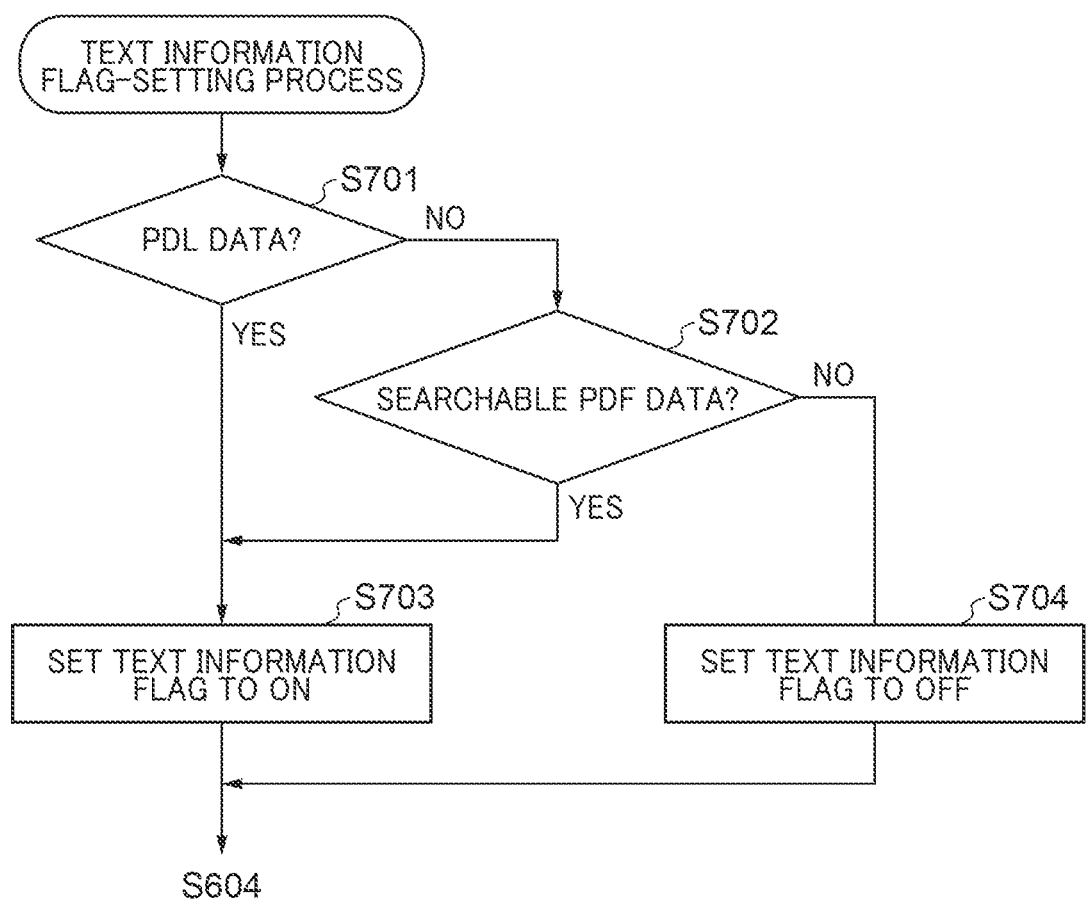
FIG. 7 is a flowchart of a text information flag-setting process performed in a step of the print control process in FIG. 6.

If it is determined in the step S602 that the inspection mode of the image forming apparatus 101 is enabled, the CPU 201 executes a text information flag-setting process described hereafter with reference to FIG. 7 (step S603).

FIG. 7 is a flowchart of the text information flag-setting process performed in the step S603 in FIG. 6.

Referring to FIG. 7, first, the CPU 201 determines whether or not print data (data to be printed) associated with the above-mentioned print job is page description language (PDL) data (step S701). Note that PDL data is data from which the image forming apparatus 101 can directly extract text information without performing the OCR processing. If it is determined in the step S701 that the print data is not PDL data, the CPU 201 determines whether or not the above-mentioned print data is searchable PDF data to which text data for performing text retrieval is added (step S702). Note that the searchable PDF data is also data from which the image forming apparatus 101 can directly extract text information without performing the OCR processing.

If it is determined in the step S702 that the print data is searchable PDF data, or if it is determined in the step S701 that the print data is PDL data, the CPU 201 sets the text information flag to ON (step S703). Then, the text information flag-setting process is terminated, and the print control process proceeds to a step S604 in FIG. 6.

If it is determined in the step S702 that the print data is not searchable PDF data, the text information flag-setting process proceeds to a step S704. Here, the print data which is neither PDL data nor searchable PDF data is data from which the image forming apparatus 101 cannot directly extract text information without performing the OCR processing. In the step S704, the CPU 201 sets the text information flag to OFF. Then, the text information flag-setting process is terminated, and the print control process proceeds to the step S604 in FIG. 6.

Referring back to FIG. 6, the CPU 201 determines whether the text information flag is set to ON or OFF (step S604).

If it is determined in the step S604 that the text information flag is set to ON, the print control process proceeds to a step S607, described hereinafter. If it is determined in the step S604 that the text information flag is set to OFF, the CPU 201 executes RIP (Raster Image Processor) processing on the print data (step S605). Then, the CPU 201 causes the data inspection processor 310 to perform the OCR processing on the RIP data generated by the RIP processing (step S606) to thereby extract text information. Thus, in the present embodiment, the steps S605 and S606 are executed on the print data from which text information used for inspection processing cannot be directly extracted without performing the OCR processing, whereby the text information of the print data is extracted. Then, the CPU 201 performs dictionary comparison processing (DLP) (step S607). More specifically, the CPU 201 compares the text information of the print data and the inspection keywords managed by the inspection setting management section 308. In the step S607, for example, in a case where the print data is data from which text information used for inspection processing can be directly extracted without performing the OCR processing, the text information directly extracted from the print data is used. On the other hand, in a case where the print data is data from which text information cannot be directly extracted without performing the OCR processing, the text information extracted by executing the steps S605 and S606 is used. Then, the CPU 201 determines whether or not any inspection keyword matching the text information extracted from the print data has been registered (step S608).

If it is determined in the step S608 that no inspection keywords matching the text information extracted from the print data have been registered, or if it is determined in the step S602 that the inspection mode of the image forming apparatus 101 is disabled, the CPU 201 prints the above-mentioned print data (step S609), followed by terminating the print control process.

If it is determined in the step S608 that any inspection keyword matching the text information extracted from the print data has been registered, the CPU 201 determines whether or not the inspection-time operation setting managed by the inspection setting management section 308 is "Display warning" (step S610).

Figure 8:
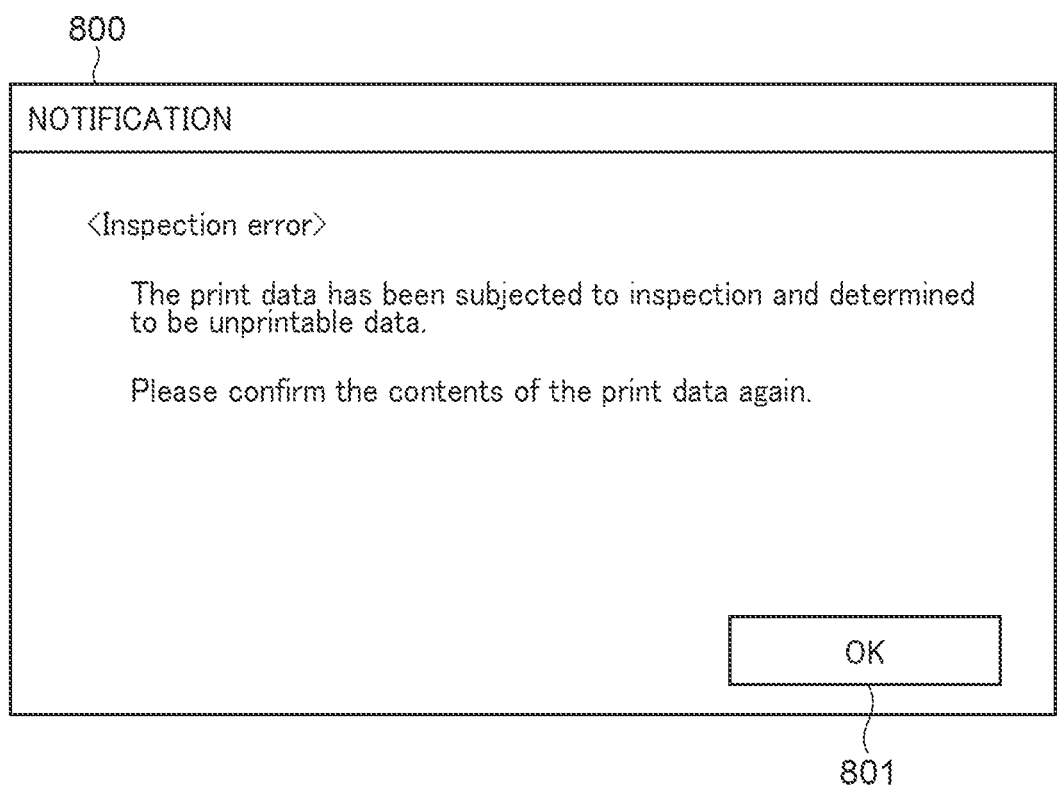
FIG. 8 is a diagram showing an example of a warning screen displayed on a console section appearing in FIG. 2.

If it is determined in the step S610 that the inspection-time operation setting is "Display warning", the CPU 201 displays a warning screen 800 shown in FIG. 8 on the console section 207 (step S611). On the warning screen 800, a message for prompting the user to confirm the contents of the print data and an OK button 801 are displayed. When the user confirms the contents of the print data and presses the OK button 801, the print control process proceeds to the step S609.

If it is determined in the step S610 that the inspection-time operation setting is not "Display warning", the CPU 201 determines whether or not the inspection-time operation setting is "Notify by email" (step S612).

If it is determined in the step S612 that the inspection-time operation setting is "Notify by email", the CPU 201 transmits a message to the effect that an inspection keyword is included in the print data to the PC 103 which is the transmission source of the print data by email before executing print processing of the print data (step S613). Note that the email transmission destination may be set to a predetermined email address, such as the email address of the administrator. The print processing method may be configured such that when an instruction for executing printing of the print data is received from the user who has confirmed the contents of the print data after transmitting the email, the print control process proceeds to the step S609. If it is determined in the step S612 that the inspection-time operation setting is not "Notify by email", the CPU 201 stops printing (step S614), followed by terminating the present process.

According to the present embodiment, in a case where print data is data from which text information can be directly extracted without performing the OCR processing, the text information is directly extracted from the print data without performing the OCR processing. That is, the need of executing the OCR processing is eliminated from the print data inspection processing. This makes it possible to reduce the time period required to perform the print data inspection processing.

Further, in the above-described embodiment, in a case where print data is data from which text information cannot be directly extracted without performing the OCR processing, the text information is extracted by performing the OCR processing on data obtained by performing the RIP processing on the print data. With this, it is possible to perform the processing for inspecting print data from which text information cannot be directly extracted without performing the OCR processing while maintaining the configuration that makes it possible to reduce the time period required to perform the processing for inspecting print data from which text information can be directly extracted without performing the OCR processing.

In the above-described embodiment, the data from which text information can be directly extracted without performing the OCR processing includes PDL data and searchable PDF data. With this, it is possible to reduce the time period required to perform the processing for inspecting the PDL data and the searchable PDF data.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-109298, filed Jun. 30, 2021, which is hereby incorporated by reference herein in its entirety.

What is claimed is:

1. An image forming apparatus for performing print processing of print data, the image forming apparatus comprising:
   a display; and
   one or more controllers, including one or more processors and one or more memories, configured to:
      register keywords indicative of confidentiality;
      set, based on the print data, a flag indicating whether or not optical character recognition (OCR) processing is to be performed on the print data, wherein:
         a first flag indicating that the OCR processing is to be performed on the print data, is set in a case where the print data is page description language (PDL) data or searchable portable document format (PDF) data; and
         a second flag indicating that the OCR processing is not to be performed on the print data is set in a case where the print data is not the PDL or searchable PDF data;
      in a case where the first flag is set:
         perform the OCR processing on the print data;
         determine whether or not text information obtained by the OCR processing matches with any of the registered keywords; and
         control the print processing of the print data based on a result of the keyword matching determination;
      in a case where the second flag is set:
         determine whether or not text information obtained without performing the OCR processing matches with any of the registered keywords; and
         control the print processing of the print data based on a result of the keyword matching determination; and
      perform the print processing of the print data based on an OK button being selected by a user in a state where the display is displaying a message indicating that the print data has been determined to be unprintable data.

2. The image forming apparatus according to claim 1, wherein the one or more controllers obtain the text information by performing the OCR processing on data obtained by performing raster image processing (RIP) on the print data.

3. The image forming apparatus according to claim 1, wherein the one or more controllers are configured to:
   set whether or not to execute inspection of the print data; and
   in a state where non-execution of the inspection is set, perform the print processing in the print data without performing the keyword matching determination.

4. The image forming apparatus according to claim 3, wherein:
   the image forming apparatus includes an operation panel, and
   the one or more controllers set whether or not to execute the inspection of the print data based on instructions received from the operation panel.

5. The image forming apparatus according to claim 3, wherein the one or more controllers control the print processing of the print data:
   without the keyword matching determination, in the state where non-execution of the inspection is set; and
   based on the result of the keyword matching determination, in a state where execution of the inspection is set.

6. The image forming apparatus according to claim 1, wherein the one or more controllers are further configured to control the print processing to not print the print data.

7. The image forming apparatus according to claim 1, wherein the one or more controllers are configured to notify the user of a message indicating that the registered keywords are included in the print data by a mail.

8. The image forming apparatus according to claim 1, wherein the one or more controllers are further configured to:
   control the display to display a screen that allows the user to select an operation to be performed by the one or more controllers in a state where any keyword matching the text information is determined to be registered, and
   perform an operation selected by the user through the screen in the state where any keyword matching the text information is determined to be registered.

9. The image forming apparatus according to claim 8, wherein the operation to be performed by the one or more controllers is one of stopping the print processing, sending a notification by email, or controlling the display to display a warning.

10. A method of controlling an image forming apparatus for performing print processing of print data, the method comprising:
   registering keywords indicative of confidentiality;
   setting, based on the print data, a flag indicating whether or not optical character recognition (OCR) processing is to be performed on the print data, wherein:
      a first flag indicating that the OCR processing is to be performed on the print data is set in a case where the print data is page description language (PDL) data or searchable portable document format (PDF) data; and
      a second flag indicating that the OCR processing is not to be performed on the print data is set in a case where the print data is not the PDL or searchable PDF data;
   in a case where the first flag is set:
      performing the OCR processing on the print data;
      determining whether or not text information obtained by the OCR processing is matched with any of the registered keywords; and
      controlling the print processing of the print data based on a result of the determining;
   in a case where the second flag is set:
      determining whether or not text information obtained without performing the OCR processing matches with any of the registered keywords; and
      controlling the print processing of the print data based on a result of the keyword matching determination; and
   performing the print processing of the print data based on an OK button being selected by a user in a state where a display is displaying a message indicating that the print data has been determined to be unprintable data.

* * * * *